(12) United States Patent
He et al.

(10) Patent No.: US 10,579,165 B2
(45) Date of Patent: Mar. 3, 2020

(54) ELECTRONIC DEVICE GLASS STRUCTURE

(71) Applicant: SCHOTT Glass Technologies (Suzhou) Co. Ltd., Suzhou (CN)

(72) Inventors: Feng He, Suzhou (CN); José Zimmer, Eppstein (DE); Ning Da, Suzhou (CN); Wentao Ju, Wuhan (CN)

(73) Assignee: Schott Glass Technologies (Suzhou) Co. Ltd, Suzhou (CN)

( * ) Notice: Subject to any disclaimer, the term of this patent is extended or adjusted under 35 U.S.C. 154(b) by 154 days.

(21) Appl. No.: 15/782,086

(22) Filed: Oct. 12, 2017

(65) Prior Publication Data

US 2018/0101253 A1 Apr. 12, 2018

(30) Foreign Application Priority Data

Oct. 12, 2016 (CN) ...................... 2016 2 1114740 U

(51) Int. Cl.
*G06F 3/0354* (2013.01)
*B32B 17/10* (2006.01)
*C03C 27/10* (2006.01)
*G06F 3/041* (2006.01)

(52) U.S. Cl.
CPC .... *G06F 3/03547* (2013.01); *B32B 17/10018* (2013.01); *C03C 27/10* (2013.01); *G06F 3/0412* (2013.01)

(58) Field of Classification Search
None
See application file for complete search history.

(56) References Cited

U.S. PATENT DOCUMENTS

| | | | | |
|---|---|---|---|---|
| 9,776,905 B2* | 10/2017 | Maschmeyer | ...... | C03B 27/0404 |
| 10,071,933 B2* | 9/2018 | Wang | ...... | C03C 15/00 |
| 2004/0189183 A1* | 9/2004 | Hu | ...... | B82Y 10/00 |
| | | | | 313/497 |
| 2005/0100667 A1* | 5/2005 | Mayer | ...... | C03C 17/002 |
| | | | | 427/248.1 |
| 2009/0197048 A1* | 8/2009 | Amin | ...... | C03C 3/085 |
| | | | | 428/142 |
| 2009/0298669 A1* | 12/2009 | Akiba | ...... | C03C 3/085 |
| | | | | 501/70 |

(Continued)

FOREIGN PATENT DOCUMENTS

WO 2014/139147 A1 9/2014

*Primary Examiner* — David D Davis
(74) *Attorney, Agent, or Firm* — Taylor IP, P.C.

(57) ABSTRACT

An electronic device structure and an ultra-thin glass sheet used therein. The electronic device structure includes a functional device and an ultra-thin glass above the functional device. The ultra-thin glass has a thickness of no more than 0.4 mm and also has a toughening layer, of which the thickness does not exceed 50% of the thickness of the ultra-thin glass. The ultra-thin glass has a total thickness variation of no more than 20 μm. The ultra-thin glass used in the electronic device structure according to the present invention provides quality assurance for subsequent potential processes, such as cutting, drilling, coating, screen-printing, laminating, gluing and the like, due to the toughening layer. Moreover, the ultra-thin glass improves functionality of the electronic device structure, in particular of the device, due to its small total thickness variation.

26 Claims, 6 Drawing Sheets

(56) References Cited

U.S. PATENT DOCUMENTS

| | | | |
|---|---|---|---|
| 2011/0003619 A1* | 1/2011 | Fujii | C03C 3/083 |
| | | | 455/566 |
| 2011/0281093 A1* | 11/2011 | Gulati | B32B 37/08 |
| | | | 428/213 |
| 2013/0034670 A1* | 2/2013 | Hashimoto | C03C 3/095 |
| | | | 428/1.32 |
| 2016/0340227 A1* | 11/2016 | Renz | C03C 3/093 |
| 2016/0340228 A1* | 11/2016 | Schreder | C03C 3/095 |
| 2016/0340229 A1* | 11/2016 | Niessner | C03C 4/04 |
| 2018/0226311 A1* | 8/2018 | Katayama | C03C 19/00 |

* cited by examiner

ELECTRONIC DEVICE GLASS STRUCTURE

BACKGROUND OF THE INVENTION

1. Field of the Invention

The present invention relates to an electronic device structure, in particular to an electronic device structure using an ultra-thin glass sheet and the ultra-thin glass sheet used therein.

2. Description of the Related Art

In recent years, as science and technology develops, thinner and thinner glasses are produced. Ultra-thin glasses with a thickness of less than 0.4 mm are used in various electronic products, such as films and sensors, in particular fingerprint identification devices, display devices, touch devices or camera devices and the like. Now, the continuously increasing need for new functions and new applications of products requires thinner and lighter glass with new properties, such as flexibility.

Generally, thin glasses may be produced by grinding a thicker glass, e.g. borosilicate glass. However, a glass sheet with a thickness of less than 0.5 mm cannot be produced by grinding and polishing a thicker glass sheet, or if possible, can only be produced under an extreme rigorous environment. Nowadays, some commercially available glasses with a thickness of less than 0.4 mm are typically produced with chemical thinning method. In brief, such thin glasses are obtained by thinning a thicker glass, e.g. a glass having a thickness of 0.55 mm, with a chemical corrosion method, in which an acid, such as HF or its mixed acid, is used. After chemical thinning, the homogeneity in thickness of the glass is hard to control. In other words, the total thickness variation (TTV) of the glass is larger than 20 µm, generally in a range from 30 µm to 50 µm. Such thickness variations are too large, for example, a fingerprint identification product. Generally, the difference between the peaks and troughs of the fingerprint texture is about 50 µm. If the TTV of the glass is larger than 20 µm, even up to 30-50 µm, it would severely influence the fingerprint identification by the chip and thereby, obviously, reduce the sensitivity of the chip.

When glass has a smaller thickness as e.g. 0.1 mm, the TTV of the glass is more critical. For a thinned glass, the glass may have a minimum thickness of 70 µm, generally of 130 µm. For some processes wherein two pieces of glass are glued together, the TTV for a same product might be up to 60 µm to 100 µm if a chemically thinned glass is used, which is beyond the desired tolerance.

Additionally, by chemical thinning, the chemical homogeneity on the glass surface is rather poor, thereby influencing the inhomogeneity and instability of the film layer after some process, such as coating.

SUMMARY OF THE INVENTION

The present invention provides an electronic device structure and an ultra-thin glass used therein, wherein the TTV of the ultra-thin glass is within a range of ±10 µm, i.e. a TTV of no more than 20 µm. For possible subsequent processes, such as cutting, boring, coating, screen printing, laminating, gluing and the like, it can ensure the quality, and improve the sensitivity of the electronic device structure, in particular fingerprint identification device.

The electronic device structure includes a functional device, and an ultra-thin glass above the functional device having a thickness of no more than 0.4 mm and has a toughening layer, wherein the toughening layer has a depth of no more than 50% of the thickness of the ultra-thin glass and the ultra-thin glass has a TTV of no more than 20 µm measured at dimensions of 500 mm×400 mm.

The ultra-thin glass used in the present invention has, before chemical toughening, a thickness of preferably less than or equal to 400 µm. The thickness can also be less than or equal to 350 µm, less than or equal to 300 µm, less than or equal to 200 µm, less than or equal to 175 µm, less than or equal to 150 µm, less than or equal to 100 µm, less than or equal to 70 µm, less than or equal to 50 µm, less than or equal to 30 µm, less than or equal to 25 µm, or less than or equal to 15 µm. However, the glass thickness should not be extremely low because the glass may break too easily. Furthermore, glasses with extremely low thickness may have a limited processability and may be difficult to handle. Preferably, the glass thickness before chemical toughening, is higher than 1 µm, and more preferably higher than 2 µm.

Preferably, the electronic device structure further includes an embedding layer above the functional device.

Preferably, the embedding layer is bonded to the functional device and/or to a supporting structure surrounding the functional device by an adhesive material structure.

Preferably, the adhesive material structure has a frame-shape or point-shape, so that a space for accommodating dielectric material is formed between the functional device and the embedding layer.

Preferably, the functional device is bonded to the embedding layer by the adhesive material structure by direct surface bonding.

Preferably, the toughening layer has a depth of no more than 30% of the thickness of the ultra-thin glass.

Preferably, the ultra-thin glass also can include an anti-bacterial ion-exchanged surface layer. The anti-bacterial ion-exchanged surface layer has a depth of less than ⅕ of the thickness of the ultra-thin glass.

Preferably, the electronic device structure further includes a functional film or a protective film on an outer surface of the ultra-thin glass. Preferably, the protective film is a polymer film.

Preferably, the functional film includes an anti-reflecting (AR) film, a super hard film, an anti-glare film (AG), an anti-bacterial membrane (AM) or an anti-fingerprint film (AF).

Preferably, the ultra-thin glass has a surface roughness Ra of less than 1 nm, more preferably less than 0.5 nm.

Preferably, the ultra-thin glass has a TTV of no more than 15 µm measured at dimensions of 500 mm×400 mm.

Preferably, the functional device includes a fingerprint chip sensor, a camera sensor, a display screen, especially a flexible display screen or a touch screen, especially a flexible touch screen.

In another embodiment, the present invention also relates to a fingerprint identification device, a display device or a touch screen device, which includes the electronic device structure mentioned above.

In a further embodiment, the present invention also relates to an ultra-thin glass sheet for use in a fingerprint identification device, an imaging device of a camera, a camera lens, a display device of a camera, a display, a mobile phone, a pad, a computer or a television, wherein the ultra-thin glass sheet has a thickness of no more than 0.4 mm and the ultra-thin glass sheet has a toughening layer. The toughening layer has a depth of no more than 50% of the thickness of the ultra-thin glass sheet and the ultra-thin glass sheet has a TTV of no more than 20 µm measured at dimensions of 500 mm×400 mm.

Preferably, the ultra-thin glass sheet has a TTV of no more than 15 µm measured at dimensions of 500 mm×400 mm.

Preferably, the ultra-thin glass sheet has a surface roughness Ra of less than 1 nm, more preferably less than 0.5 nm.

Preferably, the surface roughness Ra of the ultra-thin glass sheet is directly obtained in a glass manufacturing process without any roughness-decreasing process.

The surface roughness of the ultra-thin glass sheet is due to randomly distributed peaks and troughs of spot-like shapes and random orientations.

Preferably, the toughening layer has a depth of no more than 30% of the thickness of the ultra-thin glass.

If toughening is performed in a single step, it may be advantageous to have a quite low depth of the ion-exchanged layer (DoL), e.g. no more than 40%, preferably no more 30%, also preferably no more than 10% of the entire thickness t of the ultra-thin glass. However, if toughening is performed in multiple toughening steps, the DoL can be higher.

According to the present invention, a surface compressive stress (CS) in the ion-exchange layer is higher than 0 MPa, more preferably higher than 50 MPa, more preferably higher than 100 MPa, more preferably higher than 200 MPa, more preferably higher than 300 MPa, more preferably higher than 400 MPa, more preferably higher than 500 MPa, more preferably higher than 600 MPa. According to advantageous embodiments of the invention CS can be equal to or preferably higher than 700 MPa, more preferably higher than 800 MPa, more preferably higher than 900 MPa, further preferably higher than 1000 MPa. However, CS should not be very high because the glass may otherwise be susceptible to self-breakage. Preferably, CS is equal to or lower than 2000 MPa, preferably equal to or lower than 1800 MPa, advantageously equal to or lower than 1600 MPa, more preferably equal to or lower than 1400 MPa, more preferably equal to or lower than 1200 MPa.

Preferably, the ultra-thin glass sheet further includes an anti-bacterial ion-exchanged surface layer, which has a depth of less than ⅕ of the thickness of the ultra-thin glass sheet.

With the above mentioned technical solution, the present invention, in the electronic device structure, uses such an ultra-thin glass that the ultra-thin glass not only has enough hardness so as to meet the performance requirement in manufacturing process, but also has a TTV of no more than 20 µm, so as to improve the sensitivity and the property in lightness and thinness of the electronic device. For display products, the market requires the products to be thinner and thinner, and thus, it imposes more and more rigorous requirements on each component, in particular the homogeneity in the thickness of each component, i.e. TTV. This thin glass with low TTV, on the one hand, can meet the performance requirement of the product itself, e.g. not influencing imaging quality, such as optical distortion due to the low TTV of thin glass surface when subject to bending or twisting. On the other hand, this thin glass provides more flexible ranges for the thickness variations of other components, which allows for easy processing and cost control.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms and abbreviation used in the present invention should be understood as follows.

The term "glass" is used in its broadest sense to include glass, ceramics and/or glass ceramics. As used herein, "ultrathin glass" refers to glasses and glass sheets or articles with a thickness of equal or less than 0.4 mm, unless otherwise specified. Exemplary glass compositions optimized for thin and ultrathin forming and applications requiring ultrathin glasses are without limitation described herein or e.g. in PCT/CN2013/072695 by SCHOTT®.

Unprocessed raw glass: the glass directly obtained from the glass manufacturing process, which has not been treated with any thinning processes, such as polishing or etching. However, this glass might be subject to some treatment, which does not influence the surface quality, such as toughening, annealing and the like.

Total thickness variation (TTV): the largest variation in thickness of a substrate or of a bonded article. The Total thickness variation is generally determined by measuring the glass article or sheet in about 20-200 points in a cross pattern (not too close to the wafer edge) and calculating the maximum measured difference in thickness, i.e. TTV=Tmax−Tmin.

Compressive stress (CS): a compressive stress that is result from compression effect in a surface layer in the glass network by e.g. ion-exchange (chemical toughening) or thermal quenching (thermal toughening)

which does not generate any deformation in the glass. CS can be measured by the commercially available stress measuring instrument FSM6000 based on an optical principle.

Depth of ion-exchanged layer (DoL): the thickness of the ion-exchanged surface layer exhibiting the surface compressive stress CS. DoL can be measured by the commercially available stress measuring instrument FSM6000 based on an optical principle.

Average roughness (Ra): the roughness means the small-scale tiny peak and trough unevenness of the surface, and the average roughness Ra is the arithmetic mean value of material surface profile deviation absolute values within the sampling length. Ra can be measured by an atomic force microscope.

The technical solution according to the present invention will be clearly and completely described below in conjunction with the drawings of the present invention.

Embodiment 1

Figure 1:
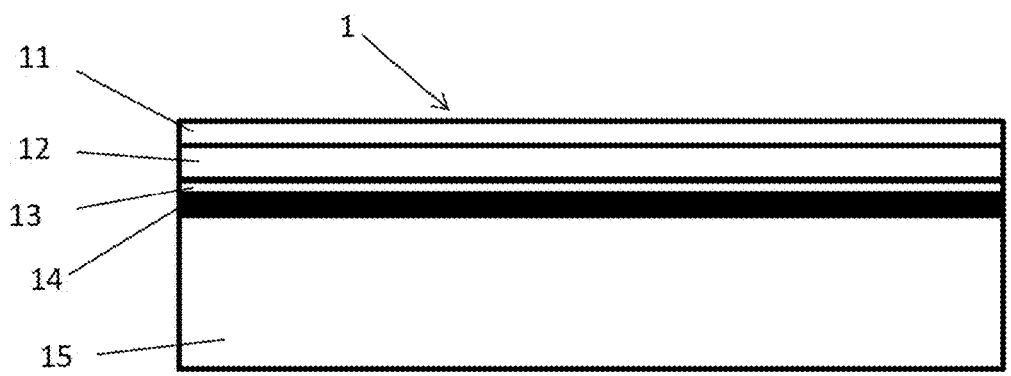
FIG. 1 is an illustrative side view of an electronic device structure according to a first embodiment of the present invention.

As shown in FIG. 1, an electronic device structure 1 according to the present invention includes a functional device 15. In the present embodiment, the functional device 15 is a fingerprint chip sensors. An embedding layer 13 is located above the functional device 15. The embedding layer 13, for example, includes an organic or inorganic ink screen-printed layer or an organic plastic film layer. The embedding layer 13 is bonded with the functional device 15 by way of an adhesive material structure 14. In the present embodiment, the adhesive material structure 14 is an adhesive material layer, which includes different types of glues, plastic sealing materials and the like. The adhesive material layer may be completely applied onto the upper surface of the functional device 15 and the lower surface of the embedding layer 13 and bonds them together. That is to say, the functional device 11 and the embedding layer 13 are directly surface bonded together by the adhesive material layer.

Figure 6:
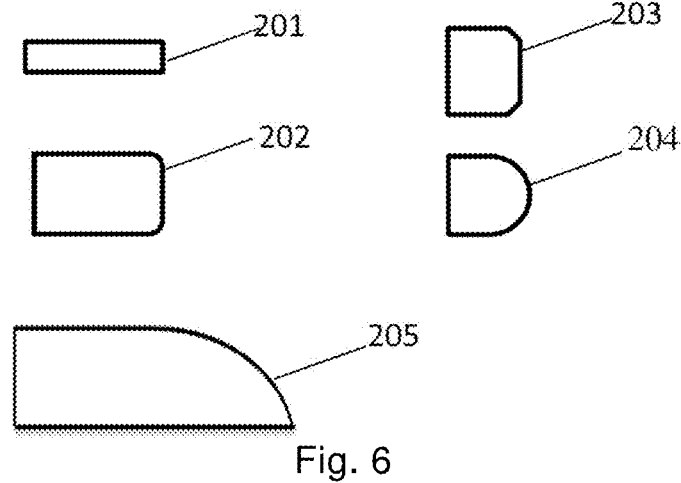
FIG. 6 is an illustrative view showing the edge shape of the ultra-thin glass according to the present invention.

The electronic device structure 1 according to the present invention also includes an ultra-thin glass 12 located above the embedding layer 13. The ultra-thin glass 12 has a thickness t of 0.175 mm, the toughening layer has a thickness of 25±4 μm and the total thickness variation (TTV) is no more than 15 μm. The ultra-thin glass has a dimension which is the same as the dimension of the fingerprint chip module, which is 10.6 mm*10.6 mm. Four corners of the ultra-thin glass 12 are rounded with a radius R of 4 mm. Alternatively, the ultra-thin glass 12 has edges of different shapes, such as an edge with a right angle 201, a rounded edge 202, a chamfered edge 203 or an edge with a semicircle 204 as shown in FIG. 6. The ultra-thin glass 12 may be formed by being thinned from an upper surface to a lower surface with an arc-shape at a corner, as indicated by 205. Different edge shapes can be seen in FIG. 6. By means of edge-treatment resulting in rounded shapes described above, the bending performance of the glass can be improved. The specific structure inside the ultra-thin glass 12 is described in detail below.

The electronic device structure 1 according to the present invention further includes a protective film 10 on ultrathin glass 12, which partially or completely covers the glass surface.

In addition or alternatively, the electronic device structure according to the present invention may also include a functional film 11 located above the ultra-thin glass 12, which for example might be an anti-reflective film, a super-hard film or an anti-fingerprint film depending on the specific application. Variants without a functional film or a protective film on top are also possible (FIG. 2).

In a variation of the present embodiment, the functional device 15 is a smart phone. In this case, the ultra-thin glass 12 functions as a protective cover. The ultra-thin glass 12 has a thickness t of 0.1 mm and the toughening layer has a thickness of 15±3 μm. Further, the glass is also subject to an anti-bacterial treatment of Ag ion exchange. The thickness of the anti-bacterial layer is 6 μm and the total thickness variation (TTV) is no more than 15 μm. The ultra-thin glass has a dimension slightly less than that of the mobile phone by 3 mm. Specifically, the mobile phone has a dimension of 138.1 mm*67 mm, and the glass has a dimension of 135.1 mm*64 mm, of which the four corners are chamfered with a radius R of 5 mm.

In another variation of the present embodiment, the functional device 15 is a display screen, in particular a flexible display screen. In this case, the ultra-thin glass 12 has a thickness t of 0.07 mm, the toughening layer has a thickness of 15±3 μm and the total thickness variation (TTV) is no more than 10 μm. The ultra-thin glass has a dimension which is the same as the dimension of the display screen.

Figure 2:
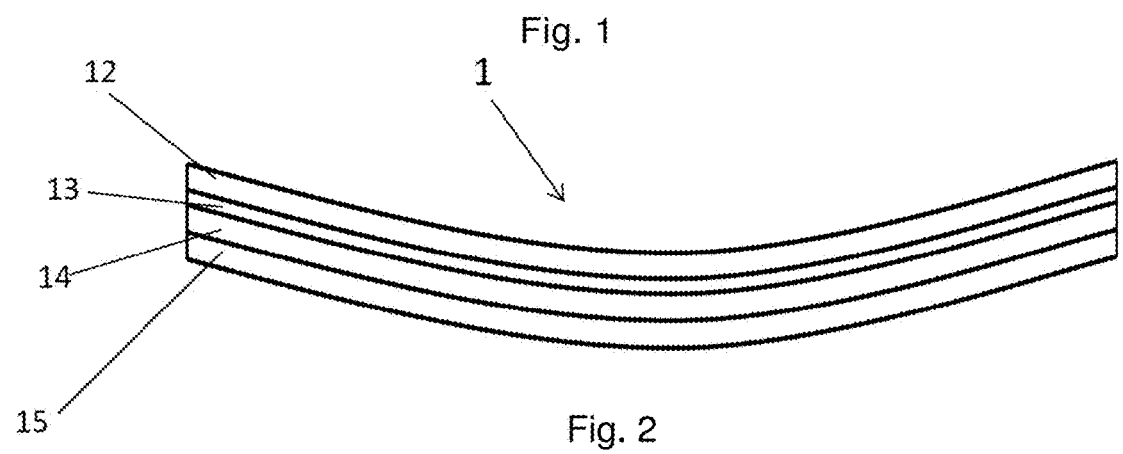
FIG. 2 is an illustrative side view of a variant of the first embodiment of FIG. 1.

In a further variant of the present embodiment, the functional device 15 is a 3D flexible display screen; see the bending state as shown in FIG. 2. In this case, the ultra-thin glass 12 has a thickness t of 0.3 mm, the toughening layer has a thickness of 30±3 μm and the total thickness variation (TTV) is no more than 10 μm. The ultra-thin glass has a dimension which is the same as the dimension of the display screen.

In a further variant of the present embodiment, the functional device 15 is a touch screen 15. Optionally, the touch screen 15 is a flexible touch screen 15. In this case, the ultra-thin glass 12 has a thickness t of 0.07 mm, the toughening layer has a thickness of 15±3 μm and the total thickness variation (TTV) is no more than 10 μm. The ultra-thin glass has a dimension which is the same as the dimension of the display screen.

Embodiment 2

Figure 3:
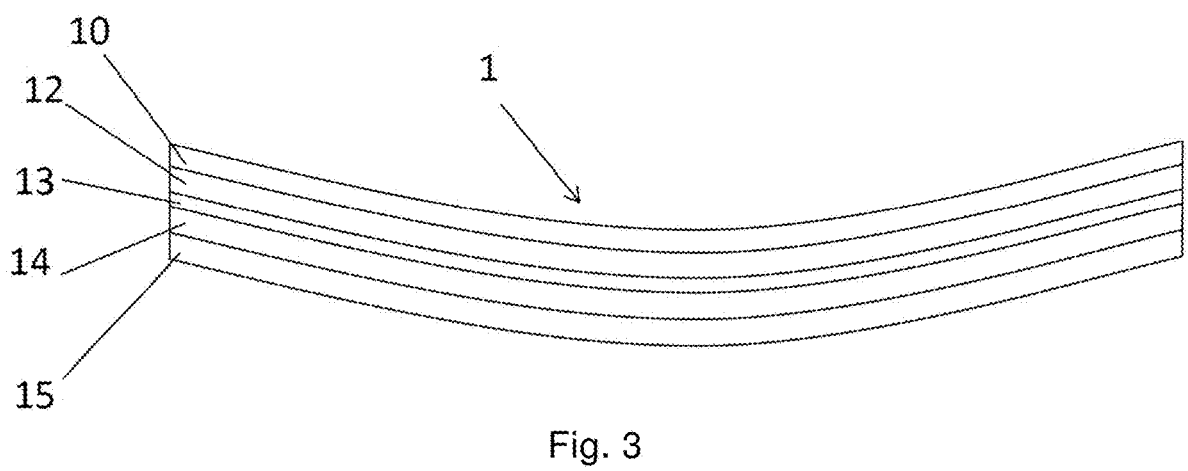
FIG. 3 is an illustrative side view of an electronic device structure according to a second embodiment of the present invention.

As shown in FIG. 3, an electronic device structure 1 according to the present invention includes a functional device, such as a flexible display screen 15. An embedding layer 13 is located above the functional device 15. The embedding layer 13, for example, includes an organic or inorganic ink screen-printed layer or an organic plastic film layer. The embedding layer 13 is bonded with the functional device 15 by an adhesive material structure 14. In the present embodiment, the adhesive material structure 14 is an adhesive material layer, which includes different types of glues, plastic sealing materials and the like. The adhesive material layer may be completely applied onto the upper surface of the flexible display screen 15 and the lower surface of the embedding layer 13 and bonds them together. That is to say, the flexible display screen 15 and the embedding layer 13 are directly surface bonded together by the adhesive material layer.

The electronic device structure 1 according to the present invention also includes an ultra-thin glass 12 located above the embedding layer 13. The ultra-thin glass 12 has a thickness t of 0.07 mm, the toughening layer 121, 122 has a thickness of 7±2 μm and the total thickness variation (TTV) is no more than 10 μm. The ultra-thin glass has a dimension which is the same as the dimension of the display screen. A protective film 10 with a thickness of 100 µm is located on the ultrathin glass 12.

Embodiment 3

Figure 4:
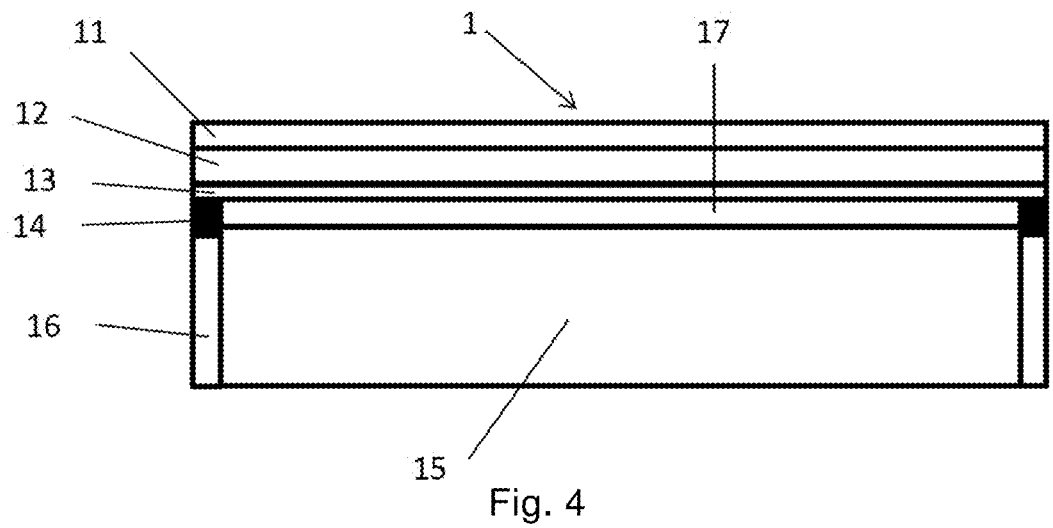
FIG. 4 is an illustrative side view of an electronic device structure according to a third embodiment of the present invention.
Figure 7:
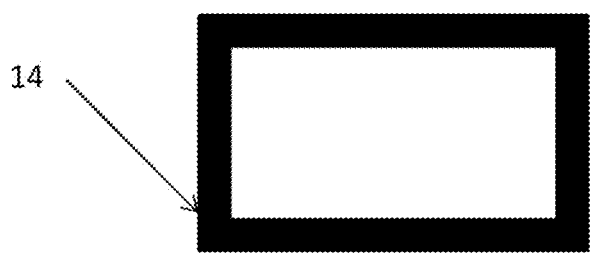
FIG. 7 is an illustrative view showing the structure of the adhesive material according to the third embodiment of the present invention.

As shown in FIG. 4, in the present embodiment, the functional device 15 is a camera module. The adhesive material structure 14 is bonded to a support structure 16 surrounding the functional device 15, but not to the functional device 15 itself. Preferably, the adhesive material structure 14 has a frame-shape (see FIG. 7) so that a space for accommodating medium material is formed between the functional device 15 and the embedding layer 13 so as to accommodate various transparent materials, such as air, optically clear adhesives (OCA), optically clear resins (OCR) and so on.

Figure 8:
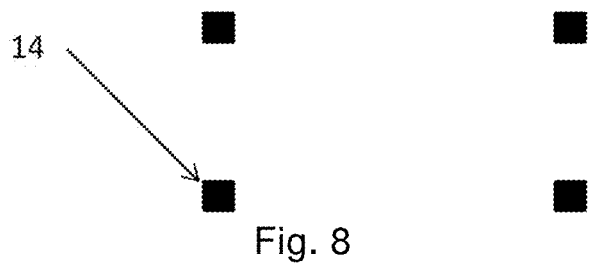
FIG. 8 is another illustrative view showing the structure of the adhesive material according to the third embodiment of the present invention.

Alternatively, adhesive material structure 14 might be in the form of a plurality of spots at edges. As shown in FIG. 8, the adhesive material structure might be four spots at four corners so as to bond the functional device 15 and the embedding layer 13 together. Similarly, in this case, the adhesive material structure 14 also forms a space for accommodating medium material between the functional device 15 and the embedding layer 13 so as to accommodate various transparent materials such as air, optically clear adhesives (OCA), optically clear resins (OCR) and so on.

In this structure, the ultra-thin glass 12 has a thickness t of 0.3 mm, the toughening layer 121 and/or 122 has a thickness of 30±4 µm and the total thickness variation (TTV) is no more than 20 µm. The ultra-thin glass has a dimension larger than the camera module by 10 mm, i.e. 11 mm*11 mm, of which the four corners are chamfered with a radius R of 4 mm.

On the glass surface, there is an anti-reflective (AR) film 11, which is applied by a sputtering process with a film thickness of 500 nm. This film improves the transmission of the entire structure by 3% or more.

In the present embodiment, the remaining structure is similar with that of the first embodiment and the description thereof is omitted.

Figure 5:
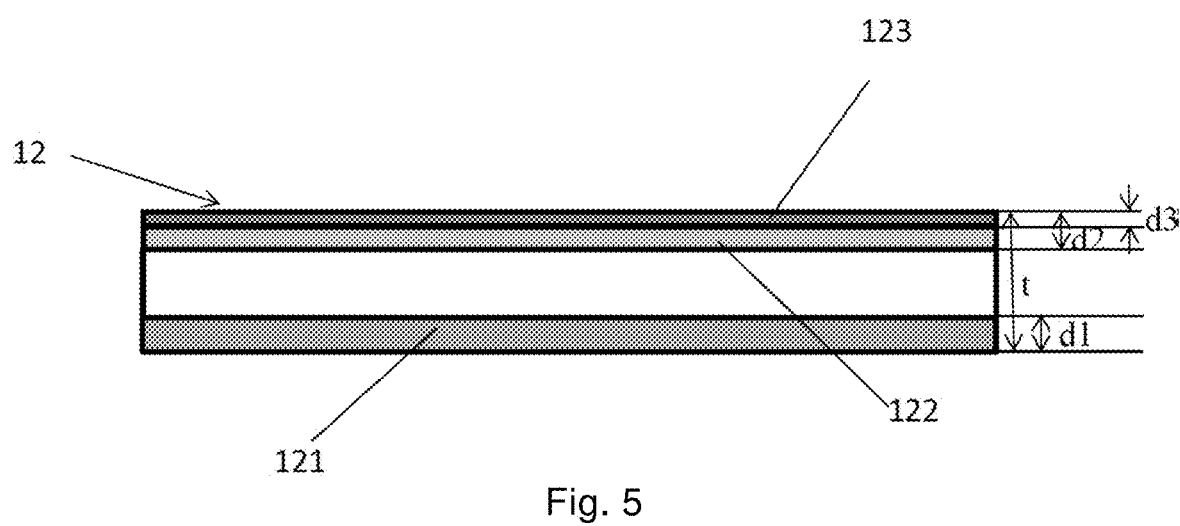
FIG. 5 is an illustrative view showing the structure of the ultra-thin glass according to the present invention.

Without limitation to the above specific embodiments and the specific parameters mentioned therein, referring to FIG. 5, the general inner structure of the ultra-thin glass 12 according to the present invention, which can be applied to the above three embodiments and their variants, is described.

The ultra-thin glass 12 has toughening layers 121, 122 formed on the upper and lower surfaces with a chemical ion-exchanging process, which, in particular when toughening is performed in a single step, has a depth (i.e. depth of ion exchange layer—DoL) $d_1$, $d_2$ of no more than 50%, preferably no more than 40%, more preferably no more than 30%, even more preferably no more than 10% of the entire thickness t of the ultra-thin glass 12. However, if toughening is performed in multiple toughening steps, the DoL can be higher.

Figure 9A:
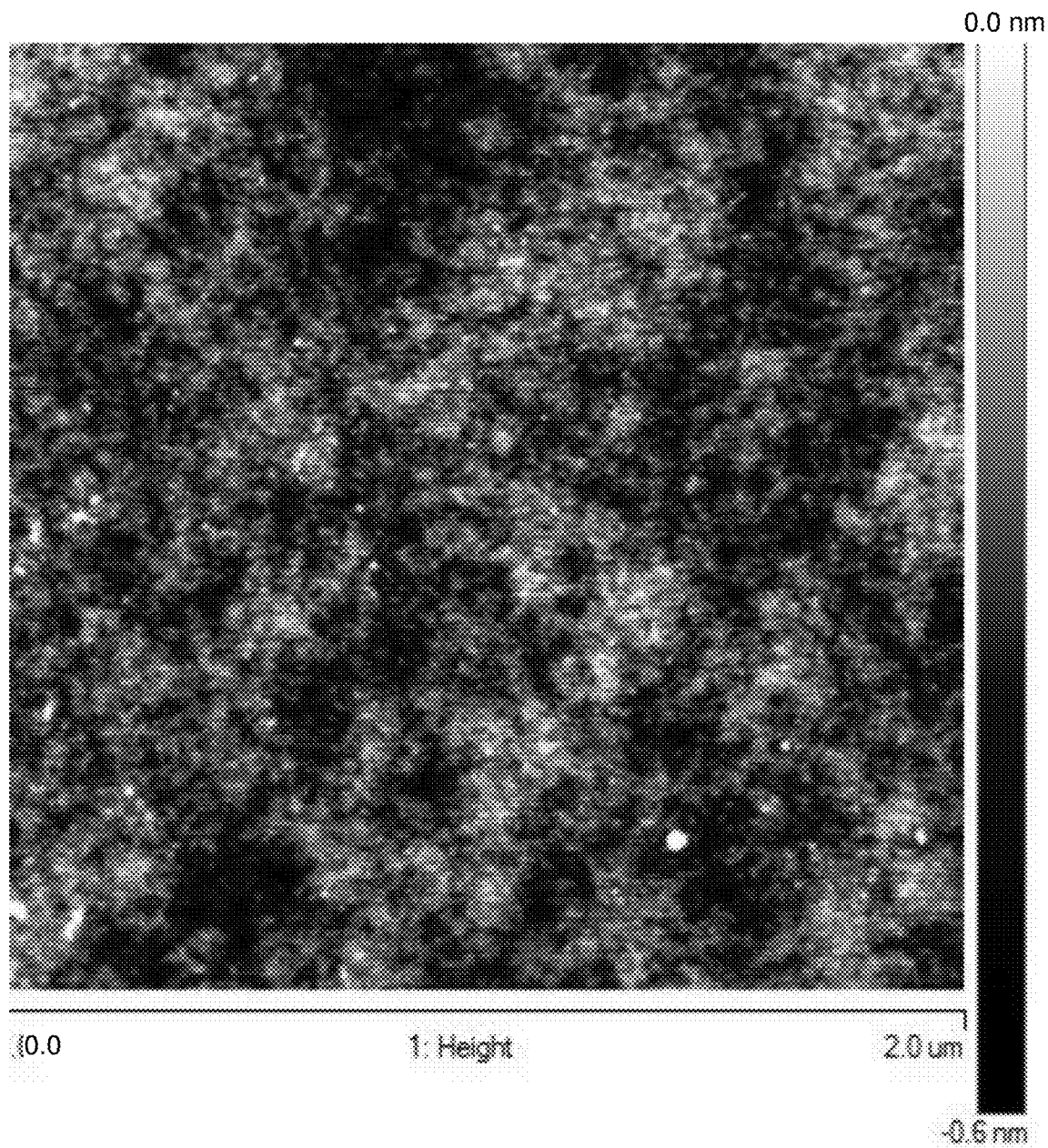
FIGS. 9A and 9B are illustrative views showing the surface roughness of glass samples according to the present invention and a thinned glass.
Figure 9B:
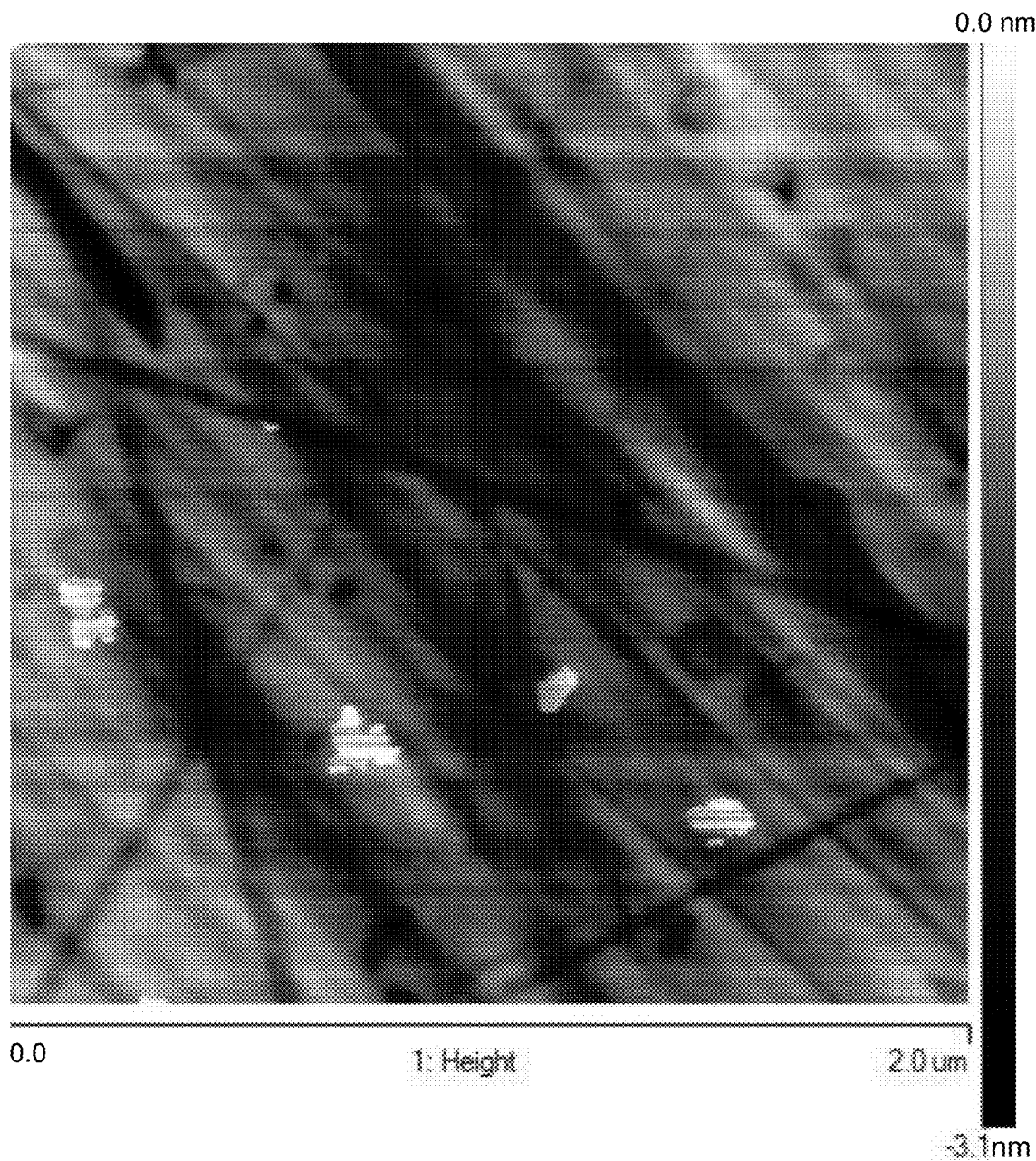
Figure 10:
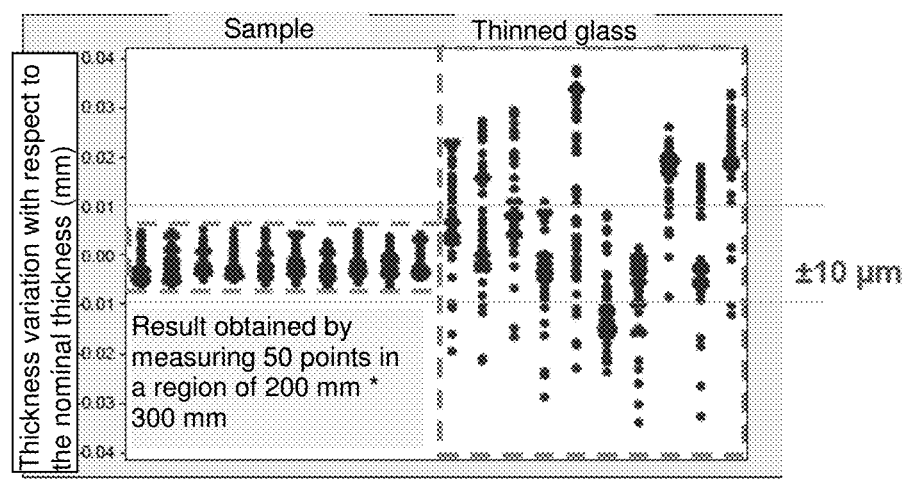
FIG. 10 shows a comparative view of the thickness variations between the glass according to the present invention and the thinned glass.

The toughening layers 121, 122 can improve the mechanical properties of the ultra-thin glass 12, such as a bending property, compression resistance or scratch resistance. If a process is adopted in which a large sheet of glass is subject to an ion-exchange process and is then cut, individual toughening layers 121, 122 are formed on the upper and lower surfaces of the ultra-thin glass 12, the thicknesses $d_1$, $d_2$ of which are no more than 30%, preferably no more than 10% of the total thickness t of the ultra-thin glass. To achieve the sensitivity of the electronic device structure 1, the ultra-thin glass according to the present invention has a total thickness variation (TTV) of no more than 20 µm, preferably no more than 15 µm, more preferably no more than 10 µm, as measured at 50 points selected from a dimension of 500 mm*400 mm with laser triangulation method, micrometer or interferometer. More preferably, the total thickness variation (TTV) as measured on a larger glass sheet of 1 m*1 m is also no more than 20 µm. Further, with respect to the nominal thickness, the ultra-thin glass 12 according to the present invention has a thickness variation of less than 10 µm, which is much less than that of the thinned glass with chemical thinning process (larger than 20 µm), as shown in FIGS. 9A, 9B and 10 (see below). A sensitivity of the functional element 15, such as fingerprint identification chip sensor, is thereby improved and in turn the identification of the fingerprint is improved.

Further, alternatively, on one surface side of the ultra-thin glass 12, an anti-bacterial ion-exchanged surface layer 123 is applied, which has a thickness (i.e. depth of ion-exchange—DoL) $d_3$ that is less than ⅕ of the thickness of the ultra-thin glass.

Generally, the ultra-thin glass 12 according to the present invention is manufactured with conventional cutting processes known by a person skilled in the art from an ultra-thin glass sheet. The manufacturing process for the ultra-thin glass sheet includes down-drawing or overflow fusion. The down-drawing and overflow fusion processes are preferably advantageous for batch production, which is economic for manufacturing the ultra-thin glass having a thickness up to 0.4 mm, preferably 0.3 mm with high surface quality. According to the present invention, the manufacturing process of direct fusion, followed by cooling in down-drawing or overflow fusion, can have a raw surface or fire-polished surface with a roughness Ra of less than 1 nm, preferably less than 0.5 nm, more preferable between 0.3 nm and 0.4 nm, and homogeneity of the chemical composition on its surface is in a nanometer range. That is to say, the surface roughness of the ultra-thin glass sheet according to the present invention is the surface roughness directly obtained in the glass manufacturing process without any roughness-decreasing process. Further, the surface roughness of the ultra-thin glass sheet is due to randomly distributed peaks and troughs of spot-like shapes and random orientations. The spot-like shapes should be understood as the shapes of the peaks and troughs, which are generally isotropic, wherein no surface dimensions are prominently larger than other dimensions of the respective peaks or troughs, and in particular, no dimensions are larger than the smallest dimension of the respective peaks or troughs by a factor of approx. 5.

FIGS. 9A and 9B show atomic force microscopic (AFM) images of the surface roughness of an ultra-thin glass as used in the invention (FIG. 9A) and a conventionally thinned alumina-silicate glass (FIG. 9B) for comparison. As can be seen from FIG. 9A, the peaks and troughs making up the surface roughness are homogeneously distributed and, generally, have an essentially spot-like shape with comparatively small dimensions. In particular, the dimensions of the peaks and troughs are significantly smaller than the typical length-scale of the depicted area which is in the micrometer range (the visible area is 2 µm×2 µm). Further, the absolute values of the differences in elevation between peaks (white) and troughs (black) in the area shown in FIG. 9A is less or equal to 0.6 nm. As such, it becomes immediately apparent that the ultra-thin glass as used in the invention has an essentially homogeneously and isotropically structured surface on length scales of micrometers with a very low surface roughness.

FIG. 9B, in contrast, shows the surface of a conventional thinned alumina-silicate glass with the same area as the image in FIG. 9A. It becomes immediately apparent that the surface has a much higher roughness and the absolute values of the differences in elevation of peaks (white) and troughs (black) can be as high as 3.1 nm. In addition, the surface structures have length scales that are larger than the visible area (2 μm×2 μm), In addition, the surface structures are highly anisotropic: rather than spot-like shapes, the structures comprise a majority of essentially parallel ridges and grooves with some individual superimposed deep grooves with random orientations. These surface features are a direct result of the surface processing of the conventional glass. In summary, the surface structure of the conventional thinned glass on the length scales as shown in FIG. 9B is highly inhomogeneous, anisotropic and has a surface roughness with differences in elevation larger by a factor of approx. 5 than the ultra-thin glass used in the invention without surface processing.

For the practical glass sheet used in the electronic device, the tolerance of the thickness variation may reach ±10 μm. According to the calculation dependent on dimensions, the TTV of a glass with a dimension 500*400 mm is thus no more than 20 μm. The TTV is smaller as the glass is smaller, and the TTV of the ultra-thin glass is smaller than 10 μm. According to the present invention, for the glass with larger dimension, e.g. 1 m*1 m, its TTV may be no more than 20 μm.

As shown on the left hand side of FIG. 10, the thickness variations with respect to the nominal thickness of a glass as used in the present invention is obtained by measuring 50 points in a region of 200 mm×300 mm all of which lie well below ±10 μm. The measurements even indicate maximum thickness variations of approx. only ±8 μm for all measurements of the glass samples. For comparison, the right hand side of FIG. 10 shows corresponding measurements of a conventional thinned glass. As can easily be gathered, the thickness variations are significantly larger than the ones of the ultra-thin glass as used in the invention. In particular, the measurements yield values as large as approx. ±35 μm with the same size of the glass.

The ultra-thin glass may be manufactured or processed in a form of a sheet or a roll. The sheet has a dimension of larger or equal to 100*100 mm², preferably larger than 400*300 mm², more preferably larger than 470*370 mm² and most preferably larger than 550*440 mm². The ultra-thin glass roll has a width larger than 250 mm, preferably larger than 320 mm, more preferably larger than 370 mm, most preferably larger than 440 mm. The glass roll has a length larger than 1 m, preferably larger than 10 m, more preferably larger than 100 m, most preferably larger than 500 m.

The toughening process can be performed by immersing the glass or glass roll into a salt bath containing monovalent ions for exchange with alkaline ions inside the glass. The monovalent ions in the salt bath have a diameter larger than that of the alkaline ion inside the glass and can produce a compression stress acted on the glass network after ion-exchange. After ion-exchange, the strength and flexibility of the ultra-thin glass are improved. Additionally, the compression stress CS induced by chemical toughening can improve the scratch resistance of the glass so that the toughened glass is not easily scratched, and a larger DoL can improve the scratch tolerance so that the glass is not easily broken, or even scratched.

The salt generally used in chemical toughening is a salt melt containing Na⁺ or a salt melt containing K⁺ or a combination thereof. The generally used salt includes sodium nitrate, potassium nitrate, sodium chloride, potassium chloride, potassium sulfate, sodium sulfate, or sodium carbonate. The additive like sodium hydroxide, potassium hydroxide or other sodium salt or potassium salt or cesium salt may be used for better controlling the rate of ion-exchange for chemical toughening. The anti-bacterial ion-exchanged surface layer 123 according to the present invention is introduced into the ultra-thin glass 12 by ion-exchange with a salt bath containing $Ag^+$ or $Cu^{2+}$. The anti-bacterial function can be imparted onto the ultra-thin glass sheet by ion-exchange in the salt bath containing $Ag^+$ or salt bath containing $Cu^{2+}$. After ion-exchange, the $Ag^+$ or $Cu^{2+}$ on the surface has a concentration of larger than 1 ppm, preferably larger than 100 ppm, and more preferably larger than 1000 ppm. The inhibition rate of bacteria is higher than 50%, preferably higher than 80% and more preferably higher than 95%. The ultra-thin glass with anti-bacterial function may be applied for medical equipment, e.g. computer or screen used in hospital.

The ion-exchange can be performed during the online roll-to-roll process or online roll-to-sheet process. During these processes, the glass roll is loaded into chemical toughening bath and then is wound into a roll again or cut into sheets. Alternatively, the chemically toughened glass roll can be directly loaded into a row of tanks for cleansing and is subsequently wound into a roll again or cut into sheets.

Since the glass is very thin, the ion-exchange should not be performed too quickly or too deeply, and the value of central tensile stress CT is very important for the ultra-thin glass, which can be represented by the following equation:

$$\sigma_{CT} = \frac{\sigma_{CS} \times L_{DoL}}{t - 2 \times L_{DoL}}.$$

wherein, $\sigma_{CS}$ is the value of CS, $L_{DoL}$ is the value of the DoL and t is the thickness of the glass. The unit for stress is MPa and the unit of the thickness is micrometer. Ion-exchange should not be performed as deep as that of a thicker glass and should not be performed too quickly in order to provide a precise control of the chemical toughening process. A deep DoL might induce a high CT and may result in self-breakage of the ultra-thin glass, or the ultra-thin glass is completely ion-exchanged, i.e. without toughening, and even CS vanishes. Typically, a high DoL with chemical toughening will not improve the strength and flexibility of the ultra-thin glass.

According to the present invention, for an ultra-thin glass, the special relationship between the glass thickness t, DoL, CS and CT is as below:

$$\frac{0.2t}{L_{DoL}} \leq \frac{\sigma_{CS}}{\sigma_{CT}}.$$

The glass according to the present invention preferably has the following parameters:

| Glass type | Aluminosilicate glass |
|---|---|
| thickness variation (μm) | ±10 |
| Pencil Hardness | >9H |
| Compression Stress (CS) | >600 MPa |

-continued

| | |
|---|---|
| Depth of Ion Exchange layer (DoL) | may be larger than 50 μm |
| | 25 ± 5 μm/0.175 mm thickness |
| Bending Strength | >600 MPa |
| Static pressure | >20 kgf |
| φ10 mm Steel ball, Steel substrate | |
| Surface quality | fire polished, Ra <<1 nm |
| Warpage (μm) | ≤100-≤1000 |
| Roughness (nm) | <0.5 |

Further, the ultra-thin glass sheet according to the present invention has the following properties in a preferred embodiment.

| Thermal properties | |
|---|---|
| Coefficient of thermal expansion ($\alpha_{(20°C;300°C)}$ ($10^{-6}K^{-1}$)) | 8.73 |
| Glass transition temperature Tg (° C.) | 621 |
| Annealing temperature ($10^{13}$ dPas) (° C.) | 633 |
| Softening temperature ($10^{7.6}$ dPas) (° C.) | 872 |
| Thermal conductivity (25° C.) (W/(mK)) | 0.96 |
| Thermal capacity (20° C.; 100° C.) (KJ/(Kg K)) | 0.84 |

| Electrical properties | | | | |
|---|---|---|---|---|
| Frequency | 1 MHz | 1 GHz | 2 GHz | 3 GHz |
| Dielectric constant | 7.74 | 7.38 | 7.35 | 7.34 |
| Loss factor tan d (about) | 0.011 | 0.010 | 0.012 | 0.012 |
| Volume resistivity pD A.C. 50 Hz | v = 250° C./$10^6$ Ωcm | | | 1.5 |
| | v = 350° C./$10^6$ Ωcm | | | 8.9 |

| Chemical properties | |
|---|---|
| Water resistance | HGB 2 |
| Acid resistance | S 4 |
| Alkali resistance | A1 |

| Mechanical properties | |
|---|---|
| Density ρ (g/cm³) | 2.46 |
| Young's modulus E (kN/mm²) | 74 |
| Shear Modulus (KN/mm²) | 30 |
| Poisson's ratio | 0.215 |
| Koop hardness HK 0.1/20 | 500 (640*) |
| Wechsler hardness HV 0.2/25 | 500 (680*) |

| Optical properties | |
|---|---|
| Refractivity (untoughenned) $n_D$ | 1.505 |
| Photoelastic coefficient (nm/cm/MPa) | 29.2 |

| Spectral transmittance t(I) - transmittance at single wavelength | |
|---|---|
| $T_{254}$ (%) | >28.4 |
| $T_{380}$ (%) | >91.7 |
| $T_{632}$ (%) | >92.3 |

*Hardness after toughening

The ultra-thin glass 12 used in the present invention is an alkaline-containing glass. The preferable glass for example is an alkaline-containing silicate glass, alkaline-containing aluminosilicate glass, alkaline-containing borosilicate glass, alkaline-containing boroaluminosilicate glass, alkaline-containing phosphate glass, alkaline-containing borophosphate glass, alkaline-containing silicate phosphate glass, or the combination thereof, or glass ceramic.

In a preferred embodiment, the glass substrates comprise a lithium aluminosilicate glass with the following composition in weight-%:

| Composition | weight-% |
|---|---|
| $SiO_2$ | 55-69 |
| $Al_2O_3$ | 18-25 |
| $Li_2O$ | 3-5 |
| $Na_2O + K_2O$ | 0-30 |
| $MgO + CaO + SrO + BaO$ | 0-5 |
| $ZnO$ | 0-4 |
| $TiO_2$ | 0-5 |
| $ZrO_2$ | 0-5 |
| $TiO_2 + ZrO_2 + SnO_2$ | 2-6 |
| $P_2O_5$ | 0-8 |
| F | 0-1 |
| $B_2O_3$ | 0-2 |

Preferably, the lithium aluminosilicate glass comprises the following glass composition in weight-%:

| Composition | weight-% |
|---|---|
| $SiO_2$ | 57-66 |
| $Al_2O_3$ | 18-23 |
| $Li_2O$ | 3-5 |
| $Na_2O + K_2O$ | 3-25 |
| $MgO + CaO + SrO + BaO$ | 1-4 |
| $ZnO$ | 0-4 |
| $TiO_2$ | 0-4 |
| $ZrO_2$ | 0-5 |
| $TiO_2 + ZrO_2 + SnO_2$ | 2-6 |
| $P_2O_5$ | 0-7 |
| F | 0-1 |
| $B_2O_3$ | 0-2 |

Further preferably, the lithium aluminosilicate glass comprises the following glass composition in weight-%:

| Composition | weight-% |
|---|---|
| $SiO_2$ | 57-63 |
| $Al_2O_3$ | 18-22 |
| $Li_2O$ | 3.5-5 |
| $Na_2O + K_2O$ | 5-20 |
| $MgO + CaO + SrO + BaO$ | 0-5 |
| $ZnO$ | 0-3 |
| $TiO_2$ | 0-3 |
| $ZrO_2$ | 0-5 |
| $TiO_2 + ZrO_2 + SnO_2$ | 2-5 |
| $P_2O_5$ | 0-5 |
| F | 0-1 |
| $B_2O_3$ | 0-2 |

In another preferred embodiment, the ultra-thin glass comprises a soda-lime glass with the following composition in weight-%:

| Composition | weight-% |
|---|---|
| $SiO_2$ | 40-81 |
| $Al_2O_3$ | 0-6 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Preferably, the soda-lime glass comprises the following glass composition in weight-%:

| Composition | weight-% |
|---|---|
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Further preferably, the soda-lime glass according to the present invention comprises the following glass composition in weight-%:

| Composition | weight-% |
|---|---|
| $SiO_2$ | 55-76 |
| $Al_2O_3$ | 0-5 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

In another preferred embodiment, the glass substrates comprise a borosilicate glass with the following composition in weight-%:

| Composition | weight-% |
|---|---|
| $SiO_2$ | 60-85 |
| $Al_2O_3$ | 0-10 |
| $B_2O_3$ | 5-20 |
| $Li_2O + Na_2O + K_2O$ | 2-16 |
| $MgO + CaO + SrO + BaO + ZnO$ | 0-15 |
| $TiO_2 + ZrO_2$ | 0-5 |
| $P_2O_5$ | 0-2 |

Preferably, the borosilicate glass according to the present invention comprises the following composition in weight-%:

| Composition | weight-% |
|---|---|
| $SiO_2$ | 63-84 |
| $Al_2O_3$ | 0-8 |
| $B_2O_3$ | 5-18 |
| $Li_2O + Na_2O + K_2O$ | 3-14 |
| $MgO + CaO + SrO + BaO + ZnO$ | 0-12 |
| $TiO_2 + ZrO_2$ | 0-4 |
| $P_2O_5$ | 0-2 |

Further preferably, the borosilicate glass according to the present invention comprises the following composition in weight-%:

| Composition | weight-% |
|---|---|
| $SiO_2$ | 63-83 |
| $Al_2O_3$ | 0-7 |
| $B_2O_3$ | 5-18 |
| $Li_2O + Na_2O + K_2O$ | 4-14 |
| $MgO + CaO + SrO + BaO + ZnO$ | 0-10 |
| $TiO_2 + ZrO_2$ | 0-3 |
| $P_2O_5$ | 0-2 |

In another preferred embodiment, the ultra-thin glass comprises an alkali metal aluminosilicate glass with the following composition in weight-%:

| Composition | weight-% |
|---|---|
| $SiO_2$ | 40-75 |
| $Al_2O_3$ | 10-30 |
| $B_2O_3$ | 0-20 |
| $Li_2O + Na_2O + K_2O$ | 4-30 |
| $MgO + CaO + SrO + BaO + ZnO$ | 0-15 |
| $TiO_2 + ZrO_2$ | 0-15 |
| $P_2O_5$ | 0-10 |

Preferably, the alkali metal aluminosilicate glass according to the present invention comprises the following composition in weight-%:

| Composition | weight-% |
|---|---|
| $SiO_2$ | 50-70 |
| $Al_2O_3$ | 10-27 |
| $B_2O_3$ | 0-18 |
| $Li_2O + Na_2O + K_2O$ | 5-28 |
| $MgO + CaO + SrO + BaO + ZnO$ | 0-13 |
| $TiO_2 + ZrO_2$ | 0-13 |
| $P_2O_5$ | 0-9 |

Further preferably, the alkali metal aluminosilicate glass according to the present invention comprises the following composition in weight-%:

| Composition | weight-% |
|---|---|
| $SiO_2$ | 55-68 |
| $Al_2O_3$ | 10-27 |
| $B_2O_3$ | 0-15 |
| $Li_2O + Na_2O + K_2O$ | 4-27 |
| $MgO + CaO + SrO + BaO + ZnO$ | 0-12 |
| $TiO_2 + ZrO_2$ | 0-10 |
| $P_2O_5$ | 0-8 |

In another preferred embodiment, the ultra-thin glass comprises an aluminosilicate glass with low alkali content with the following composition in weight-%:

| Composition | weight-% |
|---|---|
| $SiO_2$ | 50-75 |
| $Al_2O_3$ | 7-25 |
| $B_2O_3$ | 0-20 |
| $Li_2O + Na_2O + K_2O$ | 0-4 |
| $MgO + CaO + SrO + BaO + ZnO$ | 5-25 |
| $TiO_2 + ZrO_2$ | 0-10 |
| $P_2O_5$ | 0-5 |

Preferably, the aluminosilicate glass with low alkali content according to the present invention comprises the following composition in weight-%:

| Composition | weight-% |
|---|---|
| $SiO_2$ | 52-73 |
| $Al_2O_3$ | 7-23 |
| $B_2O_3$ | 0-18 |
| $Li_2O + Na_2O + K_2O$ | 0-4 |
| $MgO + CaO + SrO + BaO + ZnO$ | 5-23 |
| $TiO_2 + ZrO_2$ | 0-10 |
| $P_2O_5$ | 0-5 |

Further preferably, the aluminosilicate glass with low alkali content according to the present invention comprises the following composition in weight-%:

| Composition | weight-% |
|---|---|
| $SiO_2$ | 53-71 |
| $Al_2O_3$ | 7-22 |
| $B_2O_3$ | 0-18 |
| $Li_2O + Na_2O + K_2O$ | 0-4 |
| $MgO + CaO + SrO + BaO + ZnO$ | 5-22 |
| $TiO_2 + ZrO_2$ | 0-8 |
| $P_2O_5$ | 0-5 |

The glasses used in the present invention, in particular the above mentioned glasses, can also be modified. For example, the color can be modified by adding transition metal ions, rare earth ions as e.g. $Nd_2O_3$, $Fe_{2O3}$, CoO, NiO, $V_2O_5$, $MnO_2$, $TiO_2$, CuO, $CeO_2$, $Cr_2O_3$. Inclusion of such modifying colorant can e.g. enrich the design of consumer electronics such as color requirements for back covers or can provide an additional function for the toughened glass article as e.g. as color filters. In addition, luminescence ions, such as transition metals and rare earth ions can be added in order to endow optical functions, such as optical amplifiers, LEDs, chip lasers etc. In particular, 0-5 weight-% of rare earth oxides can be added to introduce magnetic, photon or optical functions. Moreover, refining agents as e.g. $As_2O_3$, $Sb_2O_3$, $SnO_2$, $SO_3$, Cl, F, and/or $CeO_2$ can be added into the glass compositions in amounts of 0-2 weight-%.

In a preferable embodiment of the present invention, the ultra-thin glass may have the following glass composition in weight-%.

| Composition | weight-% |
|---|---|
| $SiO_2$ | 50-70 |
| $Al_2O_3$ | 0-25 |
| $B_2O_3$ | 0-15 |
| $P_2O_5$ | 0-10 |
| $Li_2O + Na_2O + K_2O + Cs_2O$ | 0.1-25 |
| $MgO + CaO$ | 0-10 |
| $TiO_2 + ZrO_2 + SnO_2 + CeO_2$ | 0.1-8 |

It is to be understood that the sum of the components of the glass compositions amount to 100 weight-%. Further preferred variations of such glasses can be found in e.g. PCT/CN2013/072695 and are hereby incorporated by reference.

The application region of the glass according to the present invention includes the use as a cover for fingerprint identification chip, a touch screen, a bendable or foldable display panel or substrate, a protective film of a mobile phone, an outer surface cover for a mobile phone camera, a coated substrate for an optical device, a semiconductor packaging sheet or the protective cover thereof.

Due to the high dielectric constant, flexibility and scratch resistance mentioned above and excellent thickness homogeneity of the ultra-thin glass according to the present invention, it provides a safe and reliable sensitivity of user's fingerprint identification as a protective cover for a fingerprint identification chip. Further, due to its high dielectric constant, the glass can thereby provide better touch properties for a touch screen. Additionally, the ultra-thin glass according to the present invention, for a glass with a thickness of 0.25 mm, has a transmittance of 80% at an UV wavelength of 300 nm, and of 90% for visible light with a wavelength of more than 380 nm. Therefore, for a glass cover for a camera head, it exhibits an excellent transmittance as well as a flexibility and scratch resistance.

The above disclosure is only a preferred embodiment of the present invention. It should be pointed out that a person skilled in the art, without departing from the idea of the present invention, can make modifications or improvements, which shall fall in the protection scope of the present invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

REFERENCE CHARACTERS 1 electronic device structure
11 functional layer
12 ultra-thin glass
121, 122 toughening layer
123 anti-bacterial ion-exchanged layer
13 embedding layer
14 adhesive material structure
15 functional device
16 supporting structure
17 medium material space
t thickness of ultra-thin glass
d1, d2 thickness of toughening layer
d3 depth of anti-bacterial ion-exchanged layer

What is claimed is:

1. An electronic device structure, comprising:
   a functional device; and
   an ultra-thin glass above the functional device having a thickness and including a toughening layer, the toughening layer having a depth of no more than 50% of the thickness of the ultra-thin glass, the ultra-thin glass having a total thickness variation (TTV) measured at dimensions of 500 mm×400 mm of no more than 20 µm.

2. The electronic device structure of claim 1, further comprising an embedding layer above the functional device.

3. The electronic device structure of claim 2, further comprising an adhesive material structure, the embedding layer being bonded to the functional device and/or to a supporting structure surrounding the functional device by the adhesive material structure.

4. The electronic device structure of claim 3, wherein the adhesive material structure has a frame-shape, so that a space for accommodating dielectric material is formed between the functional device and the embedding layer.

5. The electronic device structure of claim 3, wherein the adhesive material structure has a shape of a plurality of spots.

6. The electronic device structure of claim 3, wherein the functional device is bonded to the embedding layer by the adhesive material structure by direct surface bonding.

7. The electronic device structure of claim 1, wherein the depth of the toughing layer is no more than 30% of the thickness of the ultra-thin glass.

8. The electronic device structure of claim 1, wherein the ultra-thin glass further includes an anti-bacterial ion-exchanged surface layer.

9. The electronic device structure of claim 8, wherein the anti-bacterial ion-exchanged surface layer has a depth of less than ⅕ of the thickness of the ultra-thin glass.

10. The electronic device structure of claim 1, further comprising a functional film or a protective film on an outer surface of the ultra-thin glass.

11. The electronic device structure of claim 10, wherein the functional film is an anti-reflective film, a super hard film, an anti-glare film or an anti-fingerprint film.

12. The electronic device structure of claim 10, wherein the protective film is a polymer film.

13. The electronic device structure of claim 1, wherein the ultra-thin glass has a surface roughness (Ra) of less than 1 nm or less than 0.5 nm.

14. The electronic device structure of claim 1, wherein the ultra-thin glass has the TTV measured at dimensions of 500 mm×400 mm of no more than 15 μm.

15. The electronic device structure of claim 1, wherein the thickness of the ultra-thin glass is no more than 0.4 mm.

16. The electronic device structure of claim 1, wherein the functional device includes at least one of a fingerprint chip sensor, a camera module, a display screen and a touch screen, the electronic device being part of one of a fingerprint identification device, or a display device or a touch screen device.

17. The electronic device structure of claim 16, wherein the display screen or touch screen is a flexible display screen or touch screen, respectively.

18. An ultra-thin glass sheet for use in a fingerprint identification device, an imaging device of a camera, a camera lens, a display device of a camera, a display, a mobile phone, a pad, a computer or a television, the ultra-thin glass sheet having a thickness t, the ultra-thin glass sheet comprising:

an ultra-thin glass; and a toughening layer coupled to the ultra-thin glass, the toughening layer having a depth of no more than 50% of the thickness t, the ultra-thin glass having a total thickness variation (TTV) of no more than 20 μm measured at dimensions of 500 mm×400 mm.

19. The ultra-thin glass sheet of claim 18, wherein the ultra-thin glass sheet has a TTV of no more than 15 μm measured at dimensions of 500 mm×400 mm.

20. The ultra-thin glass sheet one of claim 18, wherein the ultra-thin glass sheet has a surface roughness Ra of less than 1 nm or of less than 0.5 nm.

21. The ultra-thin glass sheet of claim 20, wherein the surface roughness Ra of the ultra-thin glass sheet is directly obtained in a glass manufacturing process without any roughness-decreasing process.

22. The ultra-thin glass sheet of claim 20, wherein the surface roughness of the ultra-thin glass sheet is due to randomly distributed peaks and troughs of spot-like shapes and random orientations.

23. The ultra-thin glass sheet of claim 18, wherein the depth of the toughing layer is no more than 30% of the thickness t.

24. The ultra-thin glass sheet of claim 18, further comprising an anti-bacterial ion-exchanged surface layer.

25. The ultra-thin glass sheet of claim 24, wherein the anti-bacterial ion-exchanged surface layer has a depth of less than ⅕ of the thickness t.

26. The ultra-thin glass sheet of claim 18, wherein the thickness t of the ultra-thin glass sheet is no more than 0.4 mm.

* * * * *